United States Patent

Watanabe et al.

Patent Number: 4,514,008
Date of Patent: Apr. 30, 1985

[54] VEHICLE BODY FLOOR CONSTRUCTION OF MOTOR VEHICLE

[75] Inventors: Hiroyuki Watanabe; Yasushi Tanaka, both of Toyota, Japan

[73] Assignee: Toyota Jidosha Kogyo Kabushiki Kaisha, Tokyo, Japan

[21] Appl. No.: 374,937

[22] Filed: May 5, 1982

[30] Foreign Application Priority Data

Jun. 5, 1981 [JP] Japan .................. 56-87234
Jun. 12, 1981 [JP] Japan .................. 56-90275
Jun. 12, 1981 [JP] Japan ............... 56-86600[U]

[51] Int. Cl.³ ............................................ B62D 27/02
[52] U.S. Cl. ..................................... 296/204; 280/5 A
[58] Field of Search ................... 296/204, 208, 205; 280/5 A, 5 R; 180/89.1, 314; 244/135 R

[56] References Cited

U.S. PATENT DOCUMENTS

| | | | |
|---|---|---|---|
| 3,285,359 | 11/1966 | Weeks et al. | 280/5 A X |
| 3,423,122 | 1/1969 | Wessells | 296/204 |
| 4,081,197 | 3/1978 | Ackel | 296/204 |
| 4,098,520 | 7/1978 | Ezaki et al. | 280/784 |
| 4,129,330 | 12/1978 | Schwuchow | 296/204 |
| 4,369,981 | 1/1983 | Chiba et al. | 280/5 A |

FOREIGN PATENT DOCUMENTS

| | | | |
|---|---|---|---|
| 488080 | 11/1952 | Canada | 296/203 |
| 767715 | 4/1953 | Fed. Rep. of Germany . | |
| 2929704 | 7/1979 | Fed. Rep. of Germany . | |
| 2263928 | 5/1974 | France . | |
| 2291887 | 11/1974 | France . | |
| 49-20217 | 5/1974 | Japan . | |
| 51-142220 | 8/1976 | Japan . | |
| 51-45847 | 12/1976 | Japan . | |
| 56-44943 | 6/1981 | Japan . | |
| 57-10974 | 9/1982 | Japan . | |

*Primary Examiner*—Robert B. Reeves
*Assistant Examiner*—Russell D. Stormer
*Attorney, Agent, or Firm*—Parkhurst & Oliff

[57] ABSTRACT

A vehicle body floor construction of a motor vehicle, wherein a tunnel being upwardly projecting, downwardly opening and disposed in the longitudinal direction of the vehicle is formed at the central portion in the widthwise direction of a floor panel, a fuel tank is disposed in the tunnel and at least one cross member traversing the fuel tank disposed in said tunnel in front, at the back or at the underneath of the fuel tank in a manner to block the tunnel are integrally formed on the floor panel.

20 Claims, 11 Drawing Figures

VEHICLE BODY FLOOR CONSTRUCTION OF MOTOR VEHICLE

BACKGROUND OF THE INVENTION

1. Field of the Invention

This invention relates to a vehicle body floor construction of a motor vehicle, and particularly to improvements in a vehicle body floor construction wherein a tunnel arranged in the longitudinal direction of a car is formed at the central portion in the widthwise direction of a floor panel and a fuel tank is disposed in the tunnel.

2. Description of the Prior Art

In general, in a motor vehicle, particularly, a passenger vehicle, a fuel tank has been disposed at the back of seats disposed at the rear end of space occupied by occupants, whereby there have been imposed limits on the utilization of a space in the rear portion of the vehicle by the space occupied by the fuel tank.

To solve the above-described problems, it is conceivable that, in a RR (rear engine-rear wheel drive) type motor vehicle, a FF (front engine-front wheel drive) type motor vehicle or the like, in which a propeller shaft does not longitudinally traverse a floor panel of the vehicle therebeneath, a tunnel upwardly projecting from the surface of a floor panel, downwardly opening and disposed in the longitudinal direction of the vehicle is formed at the central portion in the widthwise direction of the floor panel, and a fuel tank is disposed in the tunnel, so that effective utilization of the space in the rear portion of the vehicle can be enhanced and further reduced total length of the vehicle and decreased weight of the vehicle can be attained.

In the case of the above-described vehicle body floor construction, the fuel tank is disposed at the undersurface of the central portion of the floor panel, and hence, it is necessary to protect the fuel tank against a stone sent flying by a tire during running of the vehicle, or a curb stone or an obstacle onto which the motor vehicle runs during running.

SUMMARY OF THE INVENTION

It is therefore the primary object of the present invention to provide a vehicle body floor construction, wherein a fuel tank is protected against a flying stone, a curb stone and an obstacle in a motor vehicle having the above-described vehicle body floor construction.

Another object of the present invention is to provide a vehicle body floor construction of a motor vehicle, wherein, in a motor vehicle having the above-described construction, when cross members traversing the floor are provided, the protrusion of the cross members into a compartment is reduced, so that the compartment can be increased in space.

To achieve one of the above-described objects, the present invention contemplates that a tunnel upwardly projecting from the surface of a floor panel downwardly opening and disposed in the longitudinal direction of the vehicle is formed at the central portion in the widthwise direction of the floor panel, a fuel tank is disposed in the tunnel, and at least one cross member traversing the fuel tank disposed in the tunnel in front, at the back or at the underneath of the fuel tank in a manner to block the tunnel are integrally formed on the floor panel.

To achieve one of the above-described objects, the present invention contemplates that a tunnel being upwardly covexed, downwardly opening and disposed in the longitudinal direction of a vehicle body is formed at the central portion in the widthwise panel, a fuel tank is disposed in the tunnel, and portions close to opposite sides of the bottom opening of the tunnel are connected to each other through a bulkhead traversing the bottom opening and the fuel tank therebeneath.

To achieve one of the above-described objects, the present invention contemplates that a tunnel being upwardly convexed, downwardly opening and disposed in the longitudinal direction of a vehicle is formed at the central portion in the widthwise direction of a floor panel, a fuel tank is disposed in the tunnel, and further, there are provided a pair of left and right cross members connected to the floor panel and further connected at inner ends thereof to opposing side walls of the aforesaid tunnel portion and a bulk head traversing the bottom opening of the tunnel and the fuel tank therebeneath and connecting portions close to the inner ends of the pair of cross members.

To achieve one the above-described objects, the present invention contemplates that a tunnel upwardly projecting from the surface of a floor panel downwardly opening and disposed in the longitudinal direction of the vehicle is formed at the central portion in the widthwise direction of the floor panel, a fuel tank is disposed in the tunnel, and at least a pair of cross members traversing the fuel tank disposed in the tunnel in front and at the back of the fuel tank in a manner to block the tunnel are integrally formed on the floor panel.

Additionally, to achieve one the above-described objects, the present invention contemplates that the aforesaid cross members are disposed at positions blocking opposite ends of the tunnel in the longitudinal direction of the vehicle.

To achieve one of the above-described objects, the present invention contemplates that there are provided: a fuel tank disposed in a tunnel projecting upwardly from the surface of a floor panel, opening downwardly, disposed in the longitudinal direction of the vehicle and formed at the central portion in the widthwise direction of the floor panel; a pair of left and right cross members connected to the floor panel, and connected at inner ends thereof to opposite side surfaces of the tunnel at substantially the central position in the longitudinal direction of the vehicle of the tunnel portion; a bulkhead traversing the bottom opening of the tunnel and the fuel tank therebeneath and connecting portions close to the respective inner ends of the pair of cross members; a pair of closed cross-sectional reinforcing portions integrally formed on the floor panel at opposite sides in the widthwise direction of the bottom opening of the tunnel at least in the range of the length of the fuel tank; and cross members disposed in front and the back of the tunnel and extending in the widthwise direction of the vehicle.

Furthermore, to achieve one of the above-described objects, the present invention contemplates that, in the motor vehicle having the above-described construction, under-reinforcements extending in the longitudinal direction of the vehicle are provided on the undersurface on the floor panel at outer positions in the widthwise direction of the closed cross-sectional reinforcing portions.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the embodiments of the present invention with reference to the drawings.

As shown in FIGS. 1 to 4, in the first embodiment, a tunnel 2 being upwardly convexed, downwardly opening and disposed in the longitudinal direction of a vehicle is formed at the central portion in the widthwise direction of a floor panel 1 of an RR type motor vehicle M wherein an engine E is mounted at the rear portion of the vehicle body whereby rear wheels W are driven, a fuel tank 3 is disposed in the tunnel 2, and further, there are provided a pair of left and right cross members 5A and 5B connected to the upper surface of the floor panel 1 and further connected at inner ends thereof 40A and 40B to opposing side walls of the tunnel 2 portion and a bulkhead 6 traversing the bottom opening of the tunnel 2 and the fuel tank 3 therebeneath and connecting portions close to the inner ends of the pair of cross members 5A and 5B.

Figure 2:
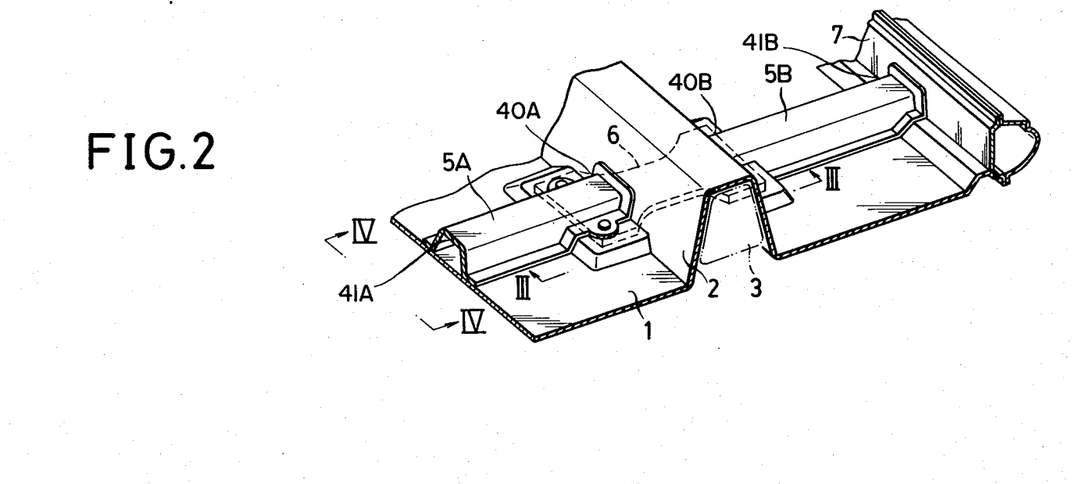
FIG. 2 is a perspective view, partially sectional, showing the essential portions of the embodiment.

More specifically, the pair of left and right cross members 5A and 5B disposed in alignment with each other in a direction traversing the upper surface of the floor panel 1 are integrally connected at the undersurfaces thereof to the floor panel 1, and integrally connected at the inner ends thereof to opposite side surfaces of the tunnel 2. Additionally, outer ends 41A and 41B of the cross members 5A and 5B are integrally connected to a rocker inner panel 7 as shown in FIG. 2.

Figure 3:
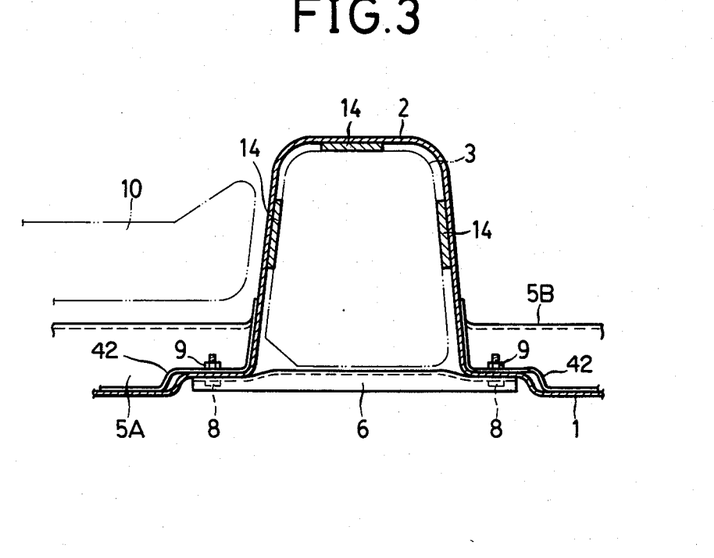
FIG. 3 is an enlarged sectional view taken along the line III—III in FIG. 2.

Furthermore, at positions on the opposite sides of the opening of the tunnel 2, the bulkhead 6 is connected to the aforesaid floor panel 1 through bolts 8 and nuts 9 at the overlapped connections between the aforesaid floor panel 1 and the cross members 5A and 5B (Refer to FIG. 3). In consequence, the pair of left and right cross members 5A and 5B traverse the tunnel 2 therebeneath and are connected to each other in the widthwise direction of the vehicle.

A portion 42 of the floor panel 1, to which the bulkhead 6 is mounted, is projected upwardly by a value equal to the thickness of the bulkhead 6 as shown in FIG. 3, so that the undersurface of the bulkhead 6 in the mounted state can be substantially flushed with the undersurface of the floor panel 1.

Figure 4:
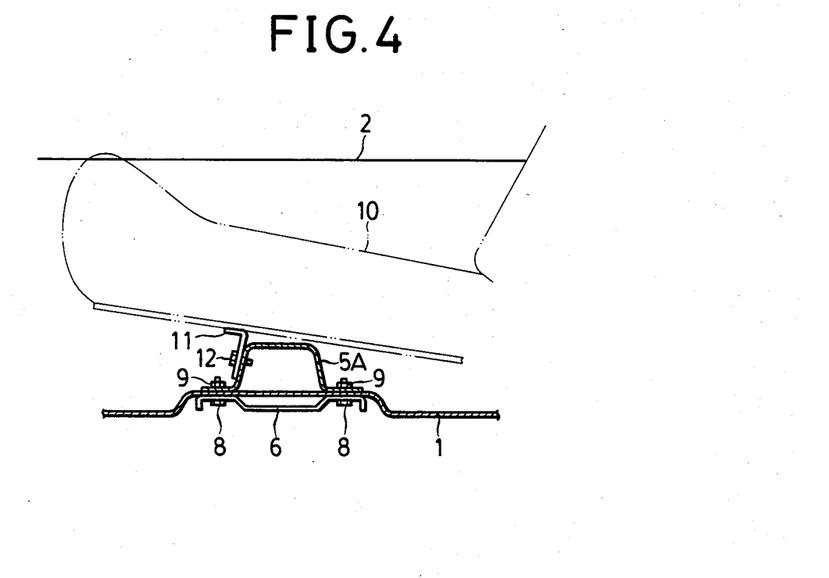
FIG. 4 is a view in the direction indicated by the arrows from line IV—IV in FIG. 2.

Furthermore, as shown in FIG. 4, at the under side of an occupant's seat 10 fixing members 11 of the seat 10 are secured to the pair of left and right cross members 5A and 5B through bolts 12, so that the space in the compartment can avoid being decreased by the cross members 5A and 5B.

Figure 1:
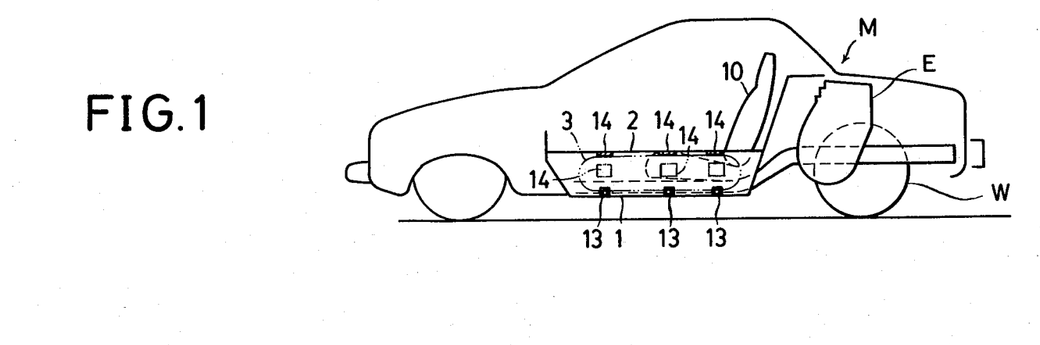
FIG. 1 is a schematic sectional view showing the essential portions of the motor vehicle to which the vehicle body floor construction is applied according to the present invention.

The aforesaid fuel tank 3 is upwardly clamped and affixed by tank bands 13 disposed at three positions in the longitudinal direction of the vehicle as shown in FIG. 1. In consequence, the fuel tank 3 is clamped by the tank bands 13 in a manner to urge a shock absorbing material 14 interposed between the inner side surface of the aforesaid tunnel 2 and the upper and side surfaces thereof, whereby the fuel tank 3 is stably supported. Here, the positions, where the tank bands 13 are secured, are selected not to interfere with the aforesaid bulkhead 6.

The above-described embodiment offers the advantages that rigidity of the floor can be improved, the fuel tank 3 can be protected against an obstacle when the vehicle runs on a curb stone or the like, and moreover, the protrusion into the compartment of the cross members can be reduced as compared with the case where the cross member is disposed on the upper surface of the tunnel 2, so that the space in the compartment can be increased.

In addition, in the above-described embodiment, the bulkhead 6 traversing the bottom opening of the tunnel 2 and fuel tank 3 therebeneath to connect the left and right side portions of the opening of the tunnel is adapted to connect the pair of left and right cross members 5A and 5B to each other at the same time, however, the present invention should not necessarily be restricted to this, but, includes the case of not providing the cross members 5A and 5B.

Furthermore, the cross members 5A and 5B normally support the occupant's seat 10 as shown in FIG. 4, however, the present invention should not necessarily be restricted to this.

Figure 5:
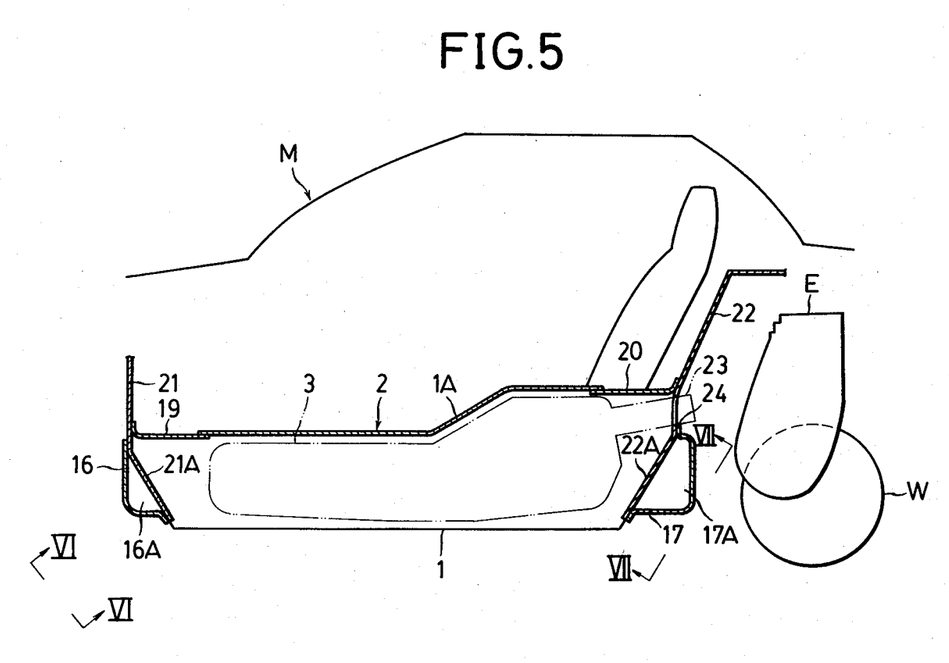
FIG. 5 is a schematic view showing the essential portions of the motor vehicle of the second embodiment of the present invention.
Figure 6:
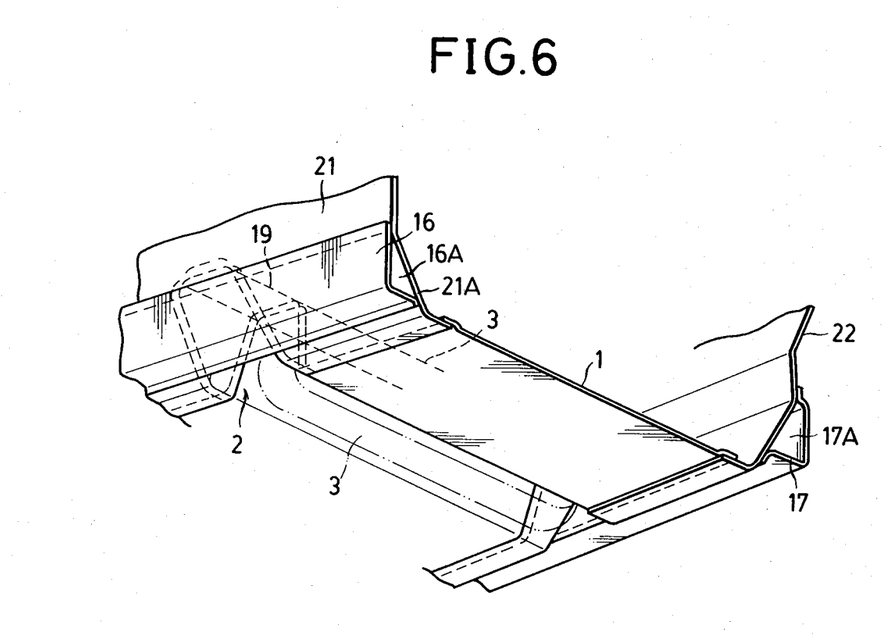
FIG. 6 is a perspective view as viewed from the line VI—VI in FIG. 5.
Figure 7:
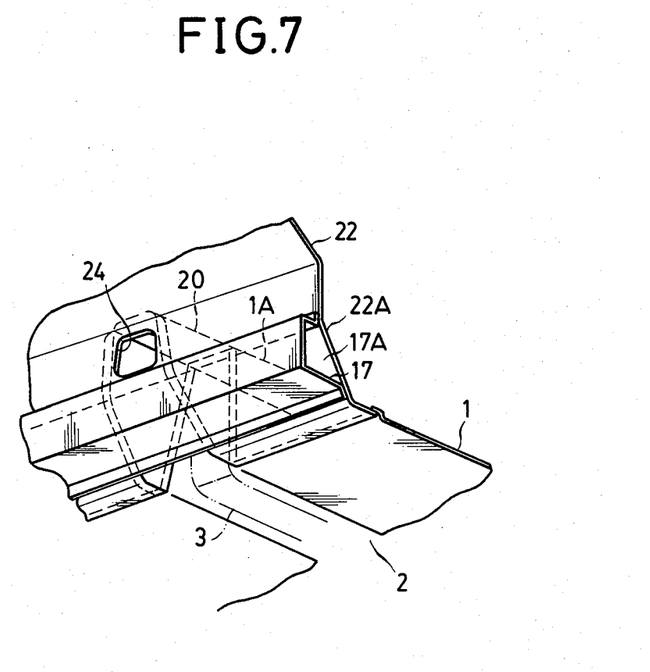
FIG. 7 is a perspective view as viewed from the line VII—VII in FIG. 5.

As shown in FIGS. 5 to 7, with the second embodiment, in a RR type motor vehicle M, a tunnel 2 upwardly projecting from the surface of a floor panel 1 and disposed in the longitudinal direction of the vehicle is formed at the central portion in the widthwise direction of the floor panel 1, a fuel tank 3 is disposed in the tunnel 2 and at least a pair of cross members 16 and 17, which may be L-shaped in cross-section, traversing the fuel tank 3 in front and at the back thereof in a manner to block the tunnel 2 are provided.

The aforesaid tunnel 2 comprises a tunnel constituent panel 1A formed by a front extension panel 19 connected to the forward portion of the tunnel constituent panel 1A and a rear extension panel 20 connected to the rear portion of the tunnel constituent panel 1A.

The aforesaid front extension panel 19 is connected at the forward end thereof to the inboard side surface of a dash panel 21 and the rear extension panel 20 is connected at the rear end thereof to a back panel 22.

The aforesaid cross member 16 is secured from below to an inclined portion 21A of the dash panel 21 below the upper surface of the aforesaid front extension panel 19. Furthermore, the aforesaid cross member 17 is secured from below to an inclined portion 22A of the back panel 22 below the upper surface of the rear extension panel 20.

In consequence, the cross member 16 and the dash panel 21 form a closed cross-section 16A traversing the vehicle at the forward end of the tunnel 2, and the cross member 17 and the back panel 22 form a closed cross-section 17A traversing the vehicle at the rear end of the tunnel 2, respectively.

The aforesaid fuel tank 3 is supported by tank bands, not shown, in the tunnel 2, an inlet pipe 23 thereof projects rearward, passing through a pipe through-hole 24 formed in the aforesaid back panel 22, at a position between the rear extension panel 20 and the cross member 17 at the back, and is further extended therefrom to the outside of the vehicle.

In the case of this embodiment, the cross members are integrally formed on the dash panel 21 and the back panel 22, and hence, such advantages can be offered that the fuel tank can be protected by use of a small number of members, and moreover, rigidity of the floor of the vehicle body can be increased.

In addition, in the above-described embodiment, the cross members are integrally formed on the dash panel and the back panel, however, the positions and the number of the cross members should not necessarily be limited to this, but, the cross members provided at least in front and at the back of the fuel tank may be used. In consequence, when the tunnel is sufficiently longer than the fuel tank, such an arrangement that an additional cross member is added to an intermediate position between the dash panel and the back panel for example may be adopted.

As shown in FIGS. 8 to 11, in the third embodiment, there are provided: a fuel tank 3 disposed in a tunnel 2 being upwardly convexed, downwardly opening, disposed in the longitudinal direction of the vehicle and formed at the central portion in the widthwise direction of a floor panel 1; a pair of left and right cross members 5A and 5B connected to the floor panel 1, and connected at inner ends thereof to opposite side surfaces of the tunnel 2 portion; a bulkhead 6 traversing the bottom opening of the tunnel 2 and the fuel tank 3 therebeneath and connecting portions close to the respective inner ends of the pair of cross members 5A and 5B; a pair of closed cross-sectional reinforcing portions 27A and 27B integrally formed on the floor panel 1 at opposite sides in the widthwise direction of the bottom opening of the tunnel 2; cross members 16 and 17 disposed in front and at the back of the tunnel 2 and extending in the widthwise direction of the vehicle in a manner to block the tunnel 2; and under-reinforcements 28A and 28B extending in the longitudinal direction of the vehicle, provided on the undersurface of the floor panel 1 at outer positions in the widthwise direction of the closed cross-sectional reinforcing portions 27A and 27B.

Figure 8:
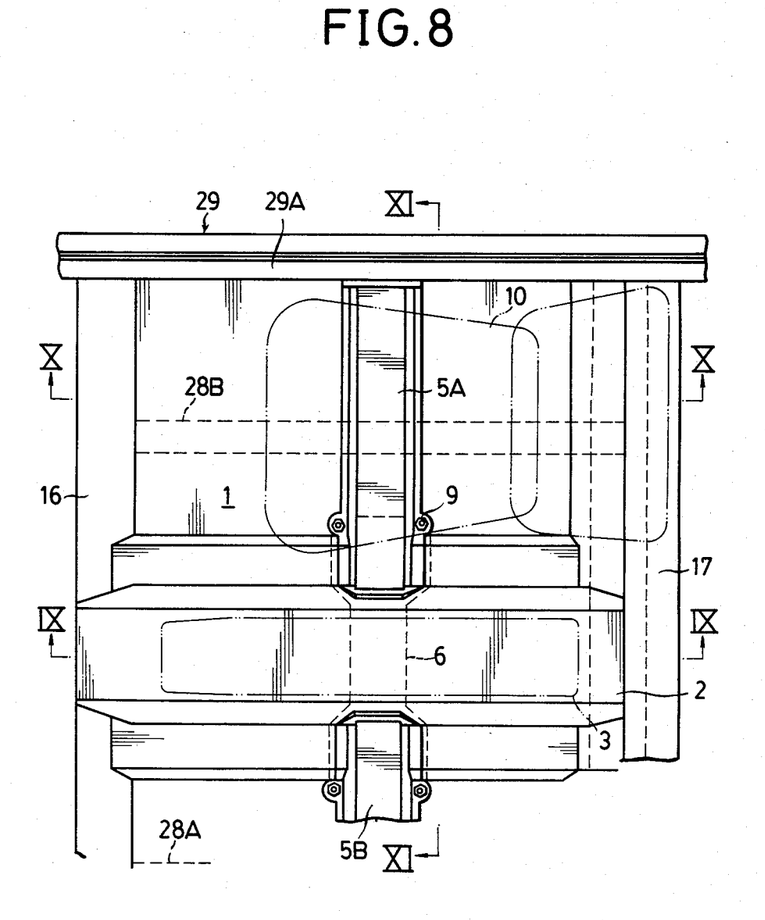
FIG. 8 is a plan view showing the vehicle body floor construction of the motor vehicle of the third embodiment of the present invention.
Figure 9:
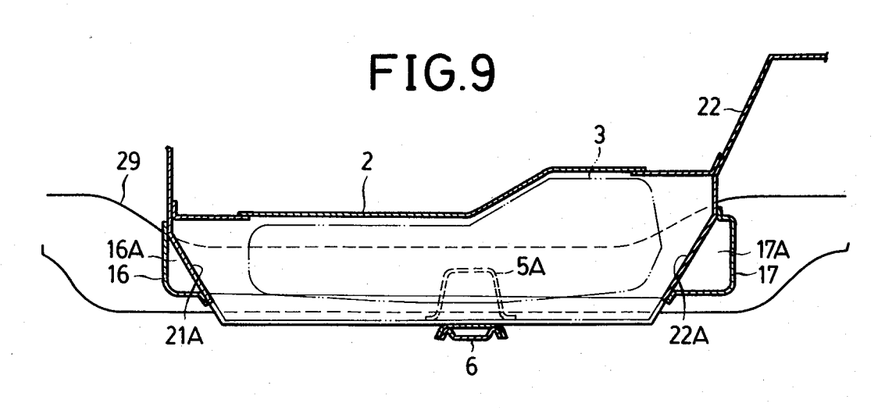
FIG. 9 is a sectional view taken along the line IX—IX in FIG. 8.
Figure 10:
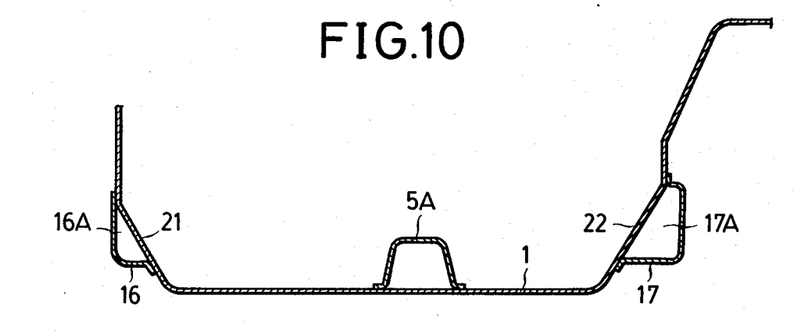
FIG. 10 is a sectional view taken along the line X—X in FIG. 8.
Figure 11:
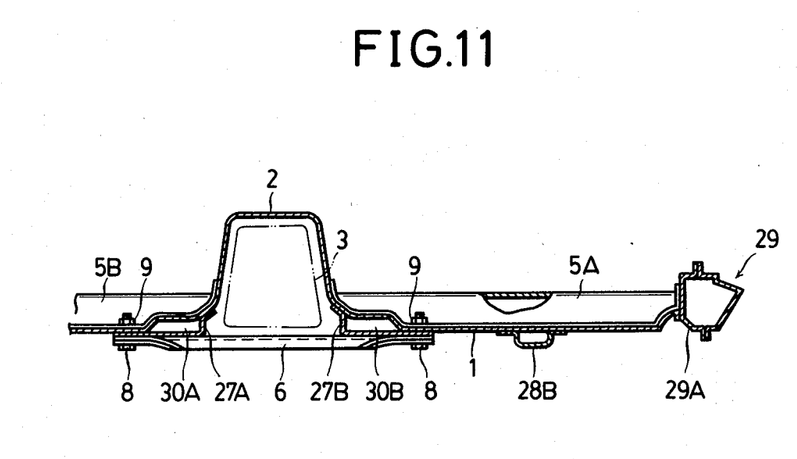
FIG. 11 is a sectional view taken aling the line XI—XI in FIG. 9.

The aforesaid pair of cross members 5A and 5B are arranged in alignment with each other in a direction of traversing the upper surface of the floor panel 1 at substantially the central position in the longitudinal direction of the tunnel 2 and the fuel tank 3, integrally connected at the undersurfaces thereof to the floor panel 1 and also integrally connected at outer ends thereof to inner side surfaces 29A of rocker panels 29 as shown in FIGS. 8 and 11.

Furthermore, opposite end portions in the widthwise direction of the aforesaid bulkhead 6 are clamped and joined through bolts 8 and nuts 9 at overlapped connections between the aforesaid floor panel 1, portions close to inner ends of the cross members 5A and 5B and outer side portions in the widthwise direction of the aforesaid closed cross-sectional reinforcing portions 27A and 27B. Consequently, with this arrangement, the aforesaid pair of left and right cross members 5A and 5B are integrally connected to each other through the bulkhead 6 in the widthwise direction on the car, traversing the tunnel 2 and the closed cross-sectional reinforcing portions 27A and 27B therebeneath.

Opposite skirt portions in the widthwise direction of the aforesaid tunnel 2 continuously upwardly project from the floor panel 1 as shown in FIG. 11, and the pair of closed cross-sectional reinforcing portions 27A and 27B extending in the longitudinal direction of the vehicle are secured to the underfaces of these projecting portions in a manner to form closed cross-sections 30A and 30B having bottom surfaces flush with the floor panel 1 and side surfaces substantially flush with the inner side surfaces of the tunnel 2.

The aforesaid cross member 16 in front is secured to the lower side of an inclined surface 21A of a dash panel 21 continuous to the floor panel 1 and forms a closed cross-section 16A being of a substantially traiangular shape in cooperation with this dash panel 21.

Additionally, the aforesaid cross member 17 at the back is secured to the rear side of a lower inclined surface 22A of the back panel 22 and forms a closed cross-section 17A traversing the rear end of the aforesaid tunnel 2 in cooperation with this back panel 22.

In the above-described embodiments, the cross members 5A and 5B are normally disposed in a dead space under an occupant's seat 10, whereby the protrusion into the compartment can be reduced as compared with the case where the cross members are disposed on the upper surface of the tunnel 2, and hence, such an advantage can be offered that the space in the compartment can be increased.

Furthermore, the cross members 16 and 17 integrally form closed cross-sections 16A and 17A in cooperation with the dash panel 21 and the back panel 22, respectively, and hence, such advantages can be offered that the fuel tank 3 can be protected by a small number of members and rigidity of the vehicle body can be increased.

In addition, in the above-described embodiment, as rigidity of the vehicle body is sufficient, the under-reinforcements 28A and 28B formed between the closed cross-sectional reinforcing portions 27A, 27B and the rocker panel 29 should not necessarily be required to be provided.

Furthermore, the closed cross-sectional reinforcing portions 27A and 27B should at least be provided in the range of the length of the fuel tank 3. Further, the closed cross-sectional reinforcing potions 27A and 27B should at least be provided to traverse the fuel tank 3 in front and at the back thereof in the widthwise direction of the vehicle, and therefore, should not necessarily be formed integrally on the dash panel or the back panel as shown in the embodiments.

It should be apparent to those skilled in the art that the above described embodiments are merely representative, and represent the applications of the principles of the present invention. Numerous and varied other arrangements can be readily devised by those skilled in the art without departing from the spirit and the scope of the invention.

What is claimed is:

1. A vehicle body floor construction of a motor vehicle, comprising:
   (a) an upwardly projecting and downwardly opening tunnel disposed in a longitudinal direction of a vehicle and formed at the central portion of a transverse direction of a floor panel of said vehicle, said tunnel having a first end and a second end;
   (b) a fuel tank disposed in said tunnel;
   (c) a first pair of cross members integrally formed in the transverse direction on said floor panel, said cross members traversing said tunnel at a forward end and at a rear end of said fuel tank and substantially at the bottom level of said fuel tank disposed in said tunnel to block said tunnel and protect said fuel tank;
   (d) a second pair of cross members comprising a left cross member and a right cross member connected to said floor panel in the transverse direction, a first end of said left cross member and a first end of said right cross member being connected to opposite outer side surfaces of said tunnel at a point which is substantially equidistant in the longitudinal direction from said first end and said second end of said tunnel;
   (e) a bulkhead traversing the opening of said tunnel below said fuel tank disposed therein, said bulkhead being connected to said floor panel at a point which is substantially equidistant in the longitudinal direction from said first end and said second end of said tunnel formed therein; and
   (f) at least two longitudinally extending closed cross-sectional reinforcing portions integrally formed on said floor panel at transversely opposite sides of the opening of said tunnel, said closed cross-sectional reinforcing portions extending for at least the length of said fuel tank.

2. A vehicle body floor construction of a motor vehicle as set forth in claim 1, further comprising a transverse back panel adjacent and blocking said first end of said tunnel and a transverse dash panel adjacent and blocking said second end of said tunnel, said first pair of cross members being integrally formed on said back panel and said dash panel.

3. A vehicle body floor construction of a motor vehicle as set forth in claim 2, wherein said cross members are substantially L-shaped in cross-section, said cross members being attached to said back panel and to said dash panel forming triangular closed cross-sections.

4. A vehicle body floor construction of a motor vehicle as set forth in claim 2, wherein a through-hole is provided in said back panel for receiving an inlet pipe of said fuel tank.

5. A vehicle body floor construction of a motor vehicle as set forth in claim 3, wherein a through-hole is provided in said back panel for receiving an inlet pipe of said fuel tank.

6. A vehicle body floor construction of a motor vehicle as set forth in claim 1, wherein left and right upwardly raised stepped portions are formed on said floor panel adjacent said opposite side surfaces of said tunnel, said first end of said left cross member and said first end of said right cross member being connected to said stepped portions and a first end and a second end of said bulkhead being disposed and connected to said floor panel in a recess formed under said stepped portions, said left and right cross members and said bulkhead being connected through said stepped portions.

7. A vehicle body floor construction of a motor vehicle as set forth in claim 2, wherein left and right upwardly raised stepped portions are formed on said floor panel adjacent said opposite side surfaces of said tunnel, said first end of said left cross member and said first end of said right cross member being connected to said stepped portions and a first end and a second end of said bulkhead being disposed and connected to said floor panel in a recess formed under said stepped portions, said left and right cross members and said bulkhead being connected through said stepped portions.

8. A vehicle body floor construction of a motor vehicle as set forth in claim 3, wherein left and right upwardly raised stepped portions are formed on said floor panel adjacent said opposite side surfaces of said tunnel, said first end of said left cross member and said first end of said right cross member being connected to said stepped portions and a first end and an second end of said bulkhead being disposed and connected to said floor panel in a recess formed under said stepped portions, said left and right cross members and said bulkhead being connected through said stepped portions.

9. A vehicle body floor construction of a motor vehicle as set forth in claim 4, wherein left and right upwardly raised stepped portions are formed on said floor panel adjacent said opposite side surfaces of said tunnel, said first end of said left cross member and said first end of said right cross member being connected to said stepped portions and a first end and a second end of said bulkhead being disposed and connected to said floor panel in a recess formed under said stepped portions, said left and right cross members and said bulkhead being connected through said stepped portions.

10. A vehicle body floor construction of a motor vehicle as set forth in claim 5, wherein left and right upwardly raised stepped portions are formed on said floor panel adjacent said opposite side surfaces of said tunnel, said first end of said left cross member and said first end of said right cross member being connected to said stepped portions and a first end and a second end of said bulkhead being disposed and connected to said floor panel in a recess formed under said stepped portions, said left and right cross members and said bulkhead being connected through said stepped portions.

11. A vehicle body floor construction of a motor vehicle as set forth in claim 6, wherein said left and right cross members extend upwardly from said floor panel forming a closed cross-section with said floor panel and said stepped portions, and said bulkhead extends downwardly from said stepped portions forming a closed cross-section with said stepped portions.

12. A vehicle body floor construction of a motor vehicle as set forth in claim 7, wherein said left and right cross members extend upwardly from said floor panel forming a closed cross-section with said floor panel and said stepped portions, and said bulkhead extends downwardly from said stepped portions forming a closed cross-section with said stepped portions.

13. A vehicle body floor construction of a motor vehicle as set forth in claim 8, wherein said left and right cross members extend upwardly from said floor panel forming a closed cross-section with said floor panel and said stepped portions, and said bulkhead extends downwardly from said stepped portions forming a closed cross-section with said stepped portions.

14. A vehicle body floor construction of a motor vehicle as set forth in claim 9, wherein said left and right cross members extend upwardly from said floor panel forming a closed cross-section with said floor panel and said stepped portions, and said bulkhead extends downwardly from said stepped portions forming a closed cross-section with said stepped portions.

15. A vehicle body floor construction of a motor vehicle as set forth in claim 10, wherein said left and right cross members extend upwardly from said floor panel forming a closed cross-section with said floor panel and said stepped portions, and said bulkhead extends downwardly from said stepped portions forming a closed cross-section with said stepped portions.

16. A vehicle body floor construction of a motor vehicle as set forth in claim 1, wherein at least two longitudinally extending under-reinforcements are provided on the undersurface of said floor panel, said under-reinforcements being laterally spaced from said closed cross-sectional reinforcing portions.

17. A vehicle body floor construction of a motor vehicle as set forth in claim 2, wherein at least two longitudinally extending under-reinforcements are provided on the undersurface of said floor panel, said under-reinforcements being laterally spaced from said closed cross-sectional reinforcing portions.

18. A vehicle body floor construction of a motor vehicle as set forth in claim 3, wherein at least two longitudinally extending under-reinforcements are provided on the undersurface of said floor panel, said under-reinforcements being laterally spaced from said closed cross-sectional reinforcing portions.

19. A vehicle body floor construction of a motor vehicle as set forth in claim 4, wherein at least two longitudinally extending under-reinforcements are provided on the undersurface of said floor panel, said under-reinforcements being laterally spaced from said closed cross-sectional reinforcing portions.

20. A vehicle body floor construction of a motor vehicle as set forth in claim 5, wherein at least two longitudinally extending under-reinforcements are provided on the undersurface of said floor panel, said under-reinforcements being laterally spaced from said closed cross-sectional reinforcing portions.

* * * * *